United States Patent
Fiore

(10) Patent No.: US 10,584,745 B2
(45) Date of Patent: Mar. 10, 2020

(54) ASYMMETRIC BEARING FOR RISER TENSIONER SYSTEM

(71) Applicant: LORD Corporation, Cary, NC (US)

(72) Inventor: Christopher Fiore, Erie, PA (US)

(73) Assignee: LORD Corporation, Cary, NC (US)

(*) Notice: Subject to any disclaimer, the term of this patent is extended or adjusted under 35 U.S.C. 154(b) by 0 days.

(21) Appl. No.: 16/281,254

(22) Filed: Feb. 21, 2019

(65) Prior Publication Data

US 2019/0316630 A1 Oct. 17, 2019

Related U.S. Application Data

(60) Provisional application No. 62/633,225, filed on Feb. 21, 2018.

(51) Int. Cl.
| | |
|---|---|
| *F16C 23/04* | (2006.01) |
| *F16C 27/06* | (2006.01) |
| *F16C 33/12* | (2006.01) |
| *E21B 19/00* | (2006.01) |

(52) U.S. Cl.
CPC .......... *F16C 27/063* (2013.01); *F16C 23/045* (2013.01); *F16C 33/122* (2013.01); *E21B 19/006* (2013.01); *F16C 2208/10* (2013.01); *F16C 2352/00* (2013.01)

(58) Field of Classification Search
CPC .. F16C 11/0614; F16C 23/043; F16C 23/045; F16C 23/046; F16C 27/063
See application file for complete search history.

(56) References Cited

U.S. PATENT DOCUMENTS

| | | | |
|---|---|---|---|
| 3,769,672 A * | 11/1973 | Eklund | B23P 6/00 29/898.01 |
| 4,002,327 A | 1/1977 | Damon | |
| 4,286,827 A | 9/1981 | Peterson et al. | |
| 4,883,387 A | 11/1989 | Myers et al. | |
| 5,013,166 A | 5/1991 | Domer | |
| 5,152,510 A | 10/1992 | Komabashiri | |
| 5,326,178 A * | 7/1994 | Strobl | F16C 23/045 384/192 |
| 5,551,803 A | 9/1996 | Pallini, Jr. et al. | |
| 6,241,225 B1 | 6/2001 | Krause | |
| 6,817,599 B2 | 11/2004 | Kato et al. | |
| 7,517,173 B2 | 4/2009 | Pollack et al. | |
| 7,866,640 B2 | 1/2011 | Funano et al. | |
| 8,579,034 B2 | 11/2013 | Berner, Jr. et al. | |
| 9,644,697 B2 | 5/2017 | Mitsch | |
| 9,709,089 B2 | 7/2017 | Bohm | |
| 9,732,816 B2 | 8/2017 | Conrad et al. | |
| 2007/0209836 A1 | 9/2007 | Kaifie et al. | |
| 2015/0093057 A1 * | 4/2015 | Hunter | B64C 27/35 384/125 |
| 2016/0273280 A1 | 9/2016 | Ptak et al. | |
| 2017/0355387 A1 | 12/2017 | Otsubo et al. | |

FOREIGN PATENT DOCUMENTS

| | | |
|---|---|---|
| EP | 0 131 518 | 1/1985 |
| WO | 2013062735 | 5/2013 |

* cited by examiner

*Primary Examiner* — Phillip A Johnson

(57) ABSTRACT

A riser tensioner bearing is provided. The riser tensioner bearing is an asymmetric bearing having an outer member comprising a cylindrical outer profile and an at least partially spherical interior profile, and an inner member comprising an at least partially spherical outer profile and a substantially cylindrical outer profile.

2 Claims, 11 Drawing Sheets

ASYMMETRIC BEARING FOR RISER TENSIONER SYSTEM

CROSS-REFERENCE TO RELATED APPLICATIONS

This application claims the benefit of, and incorporates by reference, U.S. Provisional Patent Application No. 62/633,225 filed on Feb. 21, 2018.

FIELD OF THE INVENTION

Embodiments described herein relate to systems and methods of providing flexible connections in riser tensioner systems.

BACKGROUND

Some riser tensioner systems utilize fluid cylinders to apply a tension load to a drilling riser. During operation, the cylinders are actuated to various lengths to maintain a tension load on the riser to accommodate the motion of the structure. The fluid cylinders must be free to rotate in torsion and cocking directions at upper and lower termination points to operate properly. Polytetrafluoroethylene (PTFE) coated hard bearings and shackles are commonly used at the upper and lower termination joints of the fluid cylinders. A static friction moment must be overcome before hard bearings and shackles begin to rotate. Because the static friction must be overcome each and every time the PTFE coated hard bearings begin moving from a stationary position, the large moment forces repeatedly expose the fluid cylinders to high stresses which causes premature wear and failure of seals of the fluid cylinders. When fluid cylinder seals fail, costly downtime and equipment repair and replacement expenses are incurred. Furthermore, the static friction of a bearing may increase over time as a function of surface corrosion and the introduction of particulates which both damage the bearing surfaces of current bearing solutions.

DETAILED DESCRIPTION

Figure 1:
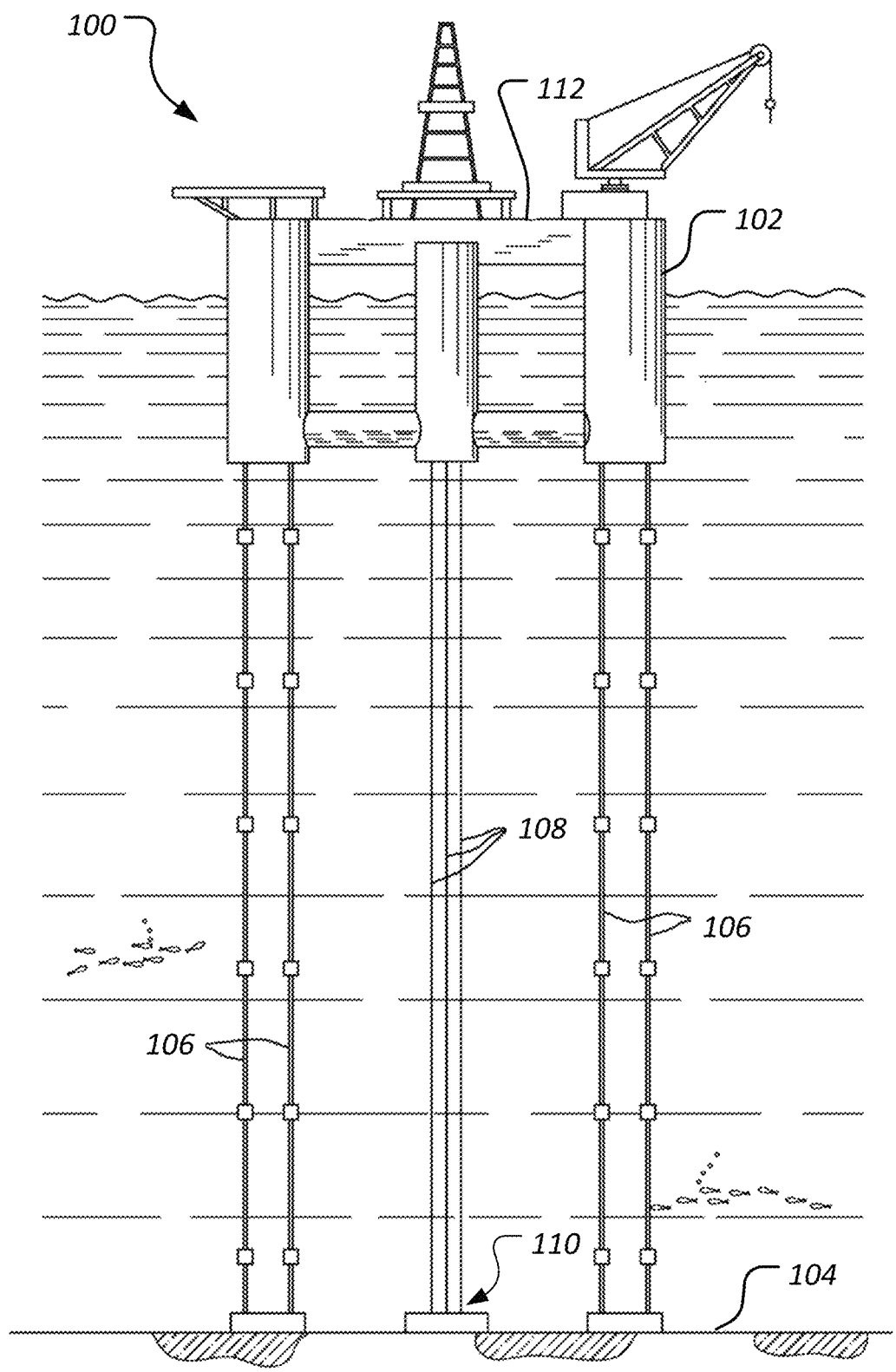
FIG. 1 is a schematic view of an offshore hydrocarbon production system that includes an asymmetric bearing.

Referring to FIG. 1, an offshore hydrocarbon production system 100 is shown. The system 100 comprises a tension leg platform 102 that is secured to the ocean floor 104 by a plurality of tendons 106. The system further comprises risers 108 that extend between individual wells of a template 110 and a deck 112 that is supported by the tension leg platform 102. The risers 108 are flexibly connected to the tension leg platform 102 to permit relative motion between the risers 108 and tension leg platform 102 that can be caused by waves contacting the tension leg platform 102 and the risers 108 that extend up from the ocean floor 104.

Figure 2:
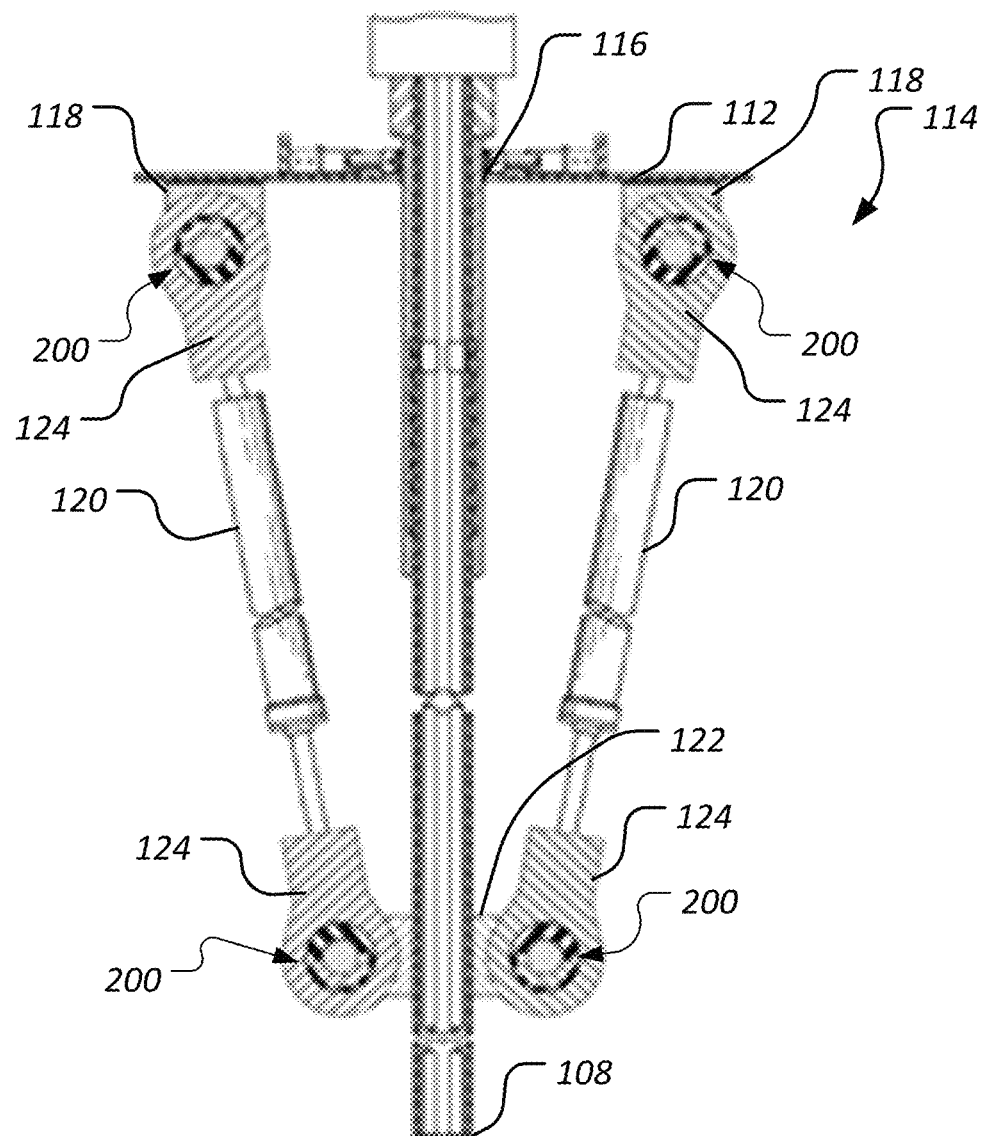
FIG. 2 is a partial cutaway view of a riser tensioner system of the offshore hydrocarbon production system of FIG. 1, the riser tensioner system including the asymmetric bearing.

FIG. 2 illustrates a portion of a riser tensioner system 114 comprising a riser 108 extending through a hole 116 of the deck 112. Upper portions of actuators 120 are coupled to the riser deck using deck connectors 118 that are configured to provide a convenient load bearing connection to the deck 112. Lower portions of actuators 120 are coupled to the riser 108 using riser connectors 122 that are configured to provide a convenient load bearing connection to the riser 108. In this manner, the actuators 120 are movably coupled between the riser 108 and the deck 112. In this embodiment, the actuators 120 are hydraulic actuators. In alternative embodiments, the actuators 120 may be pneumatic, electric screws, or any other suitable actuator. The actuators 120 are selectively controlled to lengthen and shorten to maintain a desired amount of tension applied to the riser 108. For example, in cases where the tension leg platform 102 and deck 112 are moved upward, such as due to ocean wave activity, the actuators 120 can be selectively shortened to maintain a desired tension applied to the riser 108 and/or to prevent overtensioning the riser 108. Similarly, in cases where the tension leg platform 102 and deck 112 are moved downward, the actuators 120 can be selectively lengthened to maintain a desired tension applied to the riser 108 and/or to prevent too much riser 108 weight from being transferred to underwater components of system 100. While the actuators 120 can account for vertical relative movement between the riser 108 and the deck 112, actual ocean wave activity and other sources of perturbation may cause relative movement between the riser 108 and the deck 112 in any other spatial direction and/or in a variety of directional combinations. Accordingly, bearings are provided between the actuators 120 and the deck connectors 118 as well as between the actuators 120 and the riser connectors 122. More specifically, asymmetric bearings 200 are provided.

Figure 3:
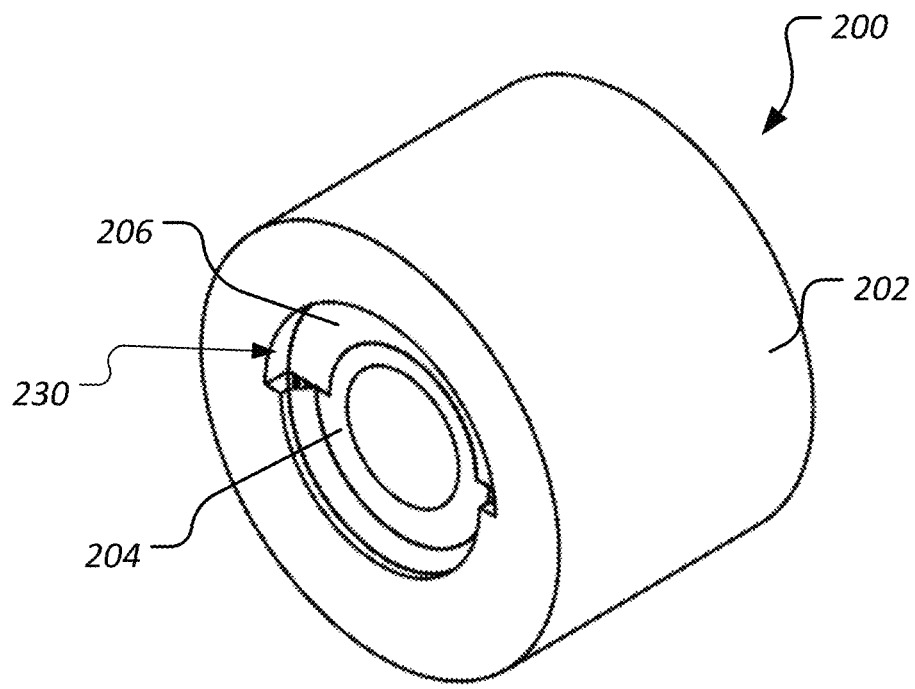
FIGS. 3-7 show the asymmetric bearing of FIG. 2.
Figure 4:
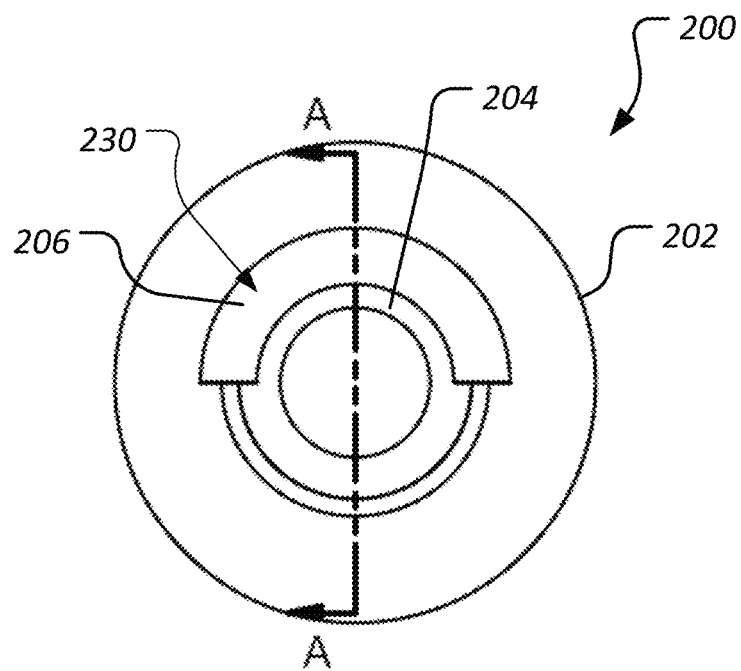
Figure 5:
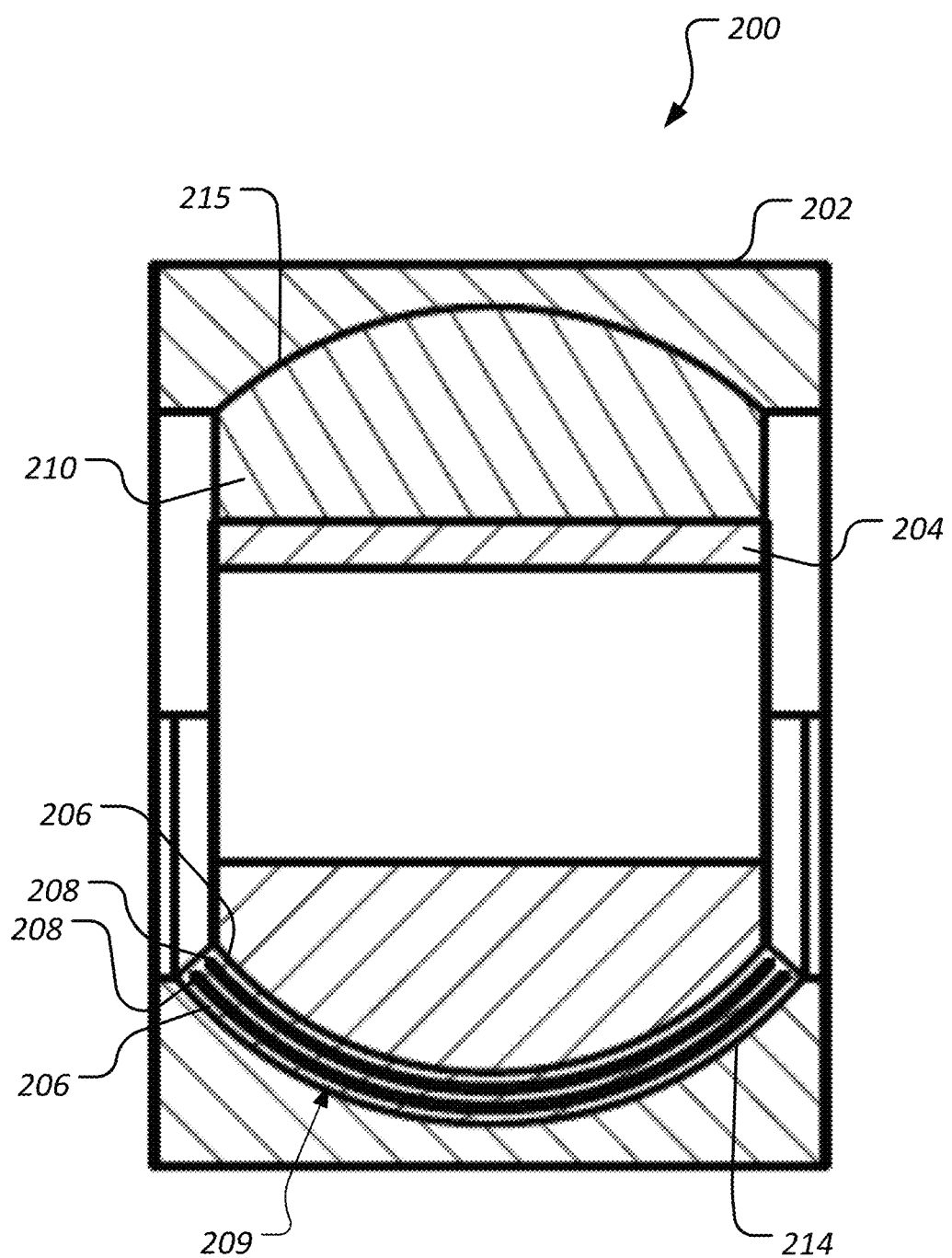
Figure 6:
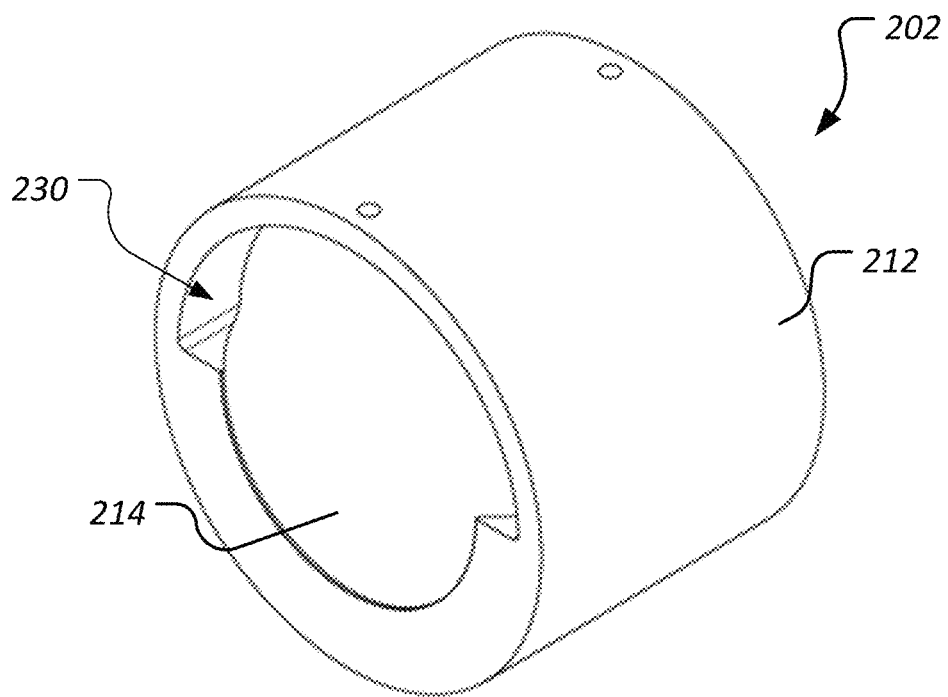
Figure 7:
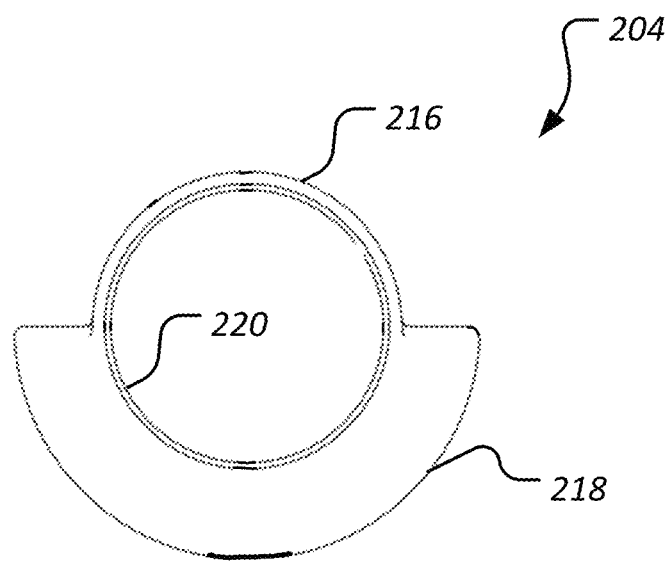

FIGS. 3-7 show an asymmetric bearing 200 according to an embodiment of this disclosure. FIG. 3 is shows an oblique view, FIG. 4 shows a front view, and FIG. 5 shows a cross-sectional side view taken along cutting line A-A of FIG. 4. FIG. 6 shows an outer member 202 of the asymmetric bearing 200 in isolation and FIG. 7 shows an inner member 204 of the asymmetric bearing 200 in isolation. The bearing 200 comprises the outer member 202, the inner member 204, elastomeric bearing layers 206, bearing shims 208, and an elastomeric spacer 210.

Referring now to FIG. 6, it is shown that the outer member 202 comprises a tubular body comprising a cylindrical outer profile 212. The outer profile 212 is shaped complementary to an aperture in an arm 124 of an actuator 120 so that the asymmetric bearing 200 can be received within the aperture of the arm 124. The outer member 202 further comprises a lower interior spherical profile 214 and an upper interior spherical profile 215. Referring now to FIG. 7, it is shown that the inner member 204 comprises a substantially cylindrical upper profile 216, a substantially semispherical lower profile 218, and a central cylindrical bore 220. When the asymmetric bearing 200 is assembled, the lower interior spherical profile 214 of the outer member 202 and the semi spherical lower profile 218 of the inner member 204 approximate the functionality of about half of a ball and socket type joint. However, the semi spherical lower profile 218 does not ride directly on the lower interior spherical profile 214, but rather, a series of elastomeric bearing layers 206 and bearing shims 208 are disposed between them. Accordingly, the lower portion of the asymmetric bearing 200 generally provides a high capacity laminate (HCL) bearing type functionality that is especially useful when forces applied to the asymmetric bearing 200 are primarily forcing the inner member 204 toward the lower interior spherical profile 214 of the outer member 202. Together, the elastomeric bearing layers 206 and the bearing shims 208 are referred to as an HCL bearing stack 209. It will be appreciated that the asymmetric bearings 200 are disposed in the arms 124 so that the lower profile 218 is located nearer a longitudinal center of the actuator 120 as compared to the distance between the cylindrical upper profile 216 and the same center of the actuator 120. In some embodiments, the asymmetric bearing 200 is aligned so that a central longitudinal axis of the actuator 120 intersects or nearly intersects a center of the semi spherical lower profile 218. Such an arrangement places the asymmetric bearing 200 in a suitable position for allowing cocking of the arm 124 relative to the inner member 204 about the central longitudinal axis of the actuator 120.

In some embodiments, the inner member 204 is additionally provided with and/or held in place, albeit in a movable manner, by elastomeric spacer 210 disposed between the upper side of the inner member 204 and the outer member 202. While the elastomeric spacer 210 is not required between the upper side of the inner member 204 and the outer member 202, it may be provided in a manner to fine tune or tailor an overall stiffness of the bearing 200.

The bearing 200 is not only capable of handling the high tensile forces that occur at least when retracting the actuators 120, but also accommodates torsion and cocking motions between the actuators 120 and the deck 112. By allowing such relative movements, the bending forces applied to the actuators 120 is reduced, yielding longer actuator 120 seal life and preventing unnecessary downtime for repairing and/or replacing the actuators 120 or the seals of the actuators 120. Put another way, the bearings 200 minimize rotational stiffness in the torsion and cocking directions, resulting in a rotational moment that is much lower than the forces associated with the current break-away forces caused by the static friction of the typical PTFE coated bearings. The bearings 200 are also provided in a small form factor that allows easy integration with existing systems that are configured to receive small bearings with cylindrical outer profiles. In some embodiments, the inner member 204 is designed to match a tube form design on the non-load bearing elastomer section. The bearings 200 reduce both the radial stiffness of the bearing as well as the rotational stiffness of the bearing. In some embodiments, the bearings 200 may be provided with no elastomeric material between the inner member 204 upper side and the outer member 202, thereby lowering the rotational stiffness of the bearing and reducing opportunities for fatigue failure of the bearing. In such a case, there may be an open passage or window 230 through the non-load bearing section of the bearing (the upper portion in FIGS. 3-5) that can be seen through. In some cases, the asymmetrical shape of the inner member 204 in combination with the window 230 on the outer member 202 allows for the inner member 204 to be installed in a solid single piece outer member 202 as well as allowing the spherical radius of the load-bearing portion of the inner member 204, the semispherical lower profile 218, to be maximized.

The bearings 200 use an asymmetric elastomer design. The load bearing elastomer section is designed to react the tension load and facilitate rotational motion along the torsion and cocking axes. The non-load bearing elastomer section of the bearing is designed to reduce the overall stiffness of the bearing. By the nature of being an elastomeric bearing the performance of the bearing will be unaffected by corrosion and particulates, unlike current PTFE (hard) bearing and shackle solutions. The load bearing elastomer section is similar to a traditional HCL design and incorporates laminated layers of elastomer and metal. The design may function using one or multiple layers of elastomer. When using multiple elastomer layers the design can incorporate metallic reinforcements in between the elastomer layers.

The bearings 200 allow provision of an HCL type bearing in a required small form factor while also minimizing bearing stiffness. Due to the large tensile loads the bearings 200 must react, the bearing provides thin but high shape factor layers in the load bearing elastomer section. Accordingly, the asymmetric inner member 204 is designed to be spherical on the load bearing elastomer section. If the entire bearing 200 used the same high shape factor load bearing design like a traditional bearing (all 360 degrees instead of 180 degrees or less) the overall stiffness of the bearing 200 would be much stiffer, undesirably increasing the rotational moment applied to the actuator 120 and minimizing the benefits of the softer elastomeric design.

The non-load bearing section is designed to maximize the amount of elastomer, which minimizes the overall rotational stiffness of the bearing. This is unique in that it minimizes the stiffness in the allotted form factor space. The asymmetric inner member 204 can be designed to match a tube form design on the non-load bearing elastomer section, but more important, is the removal of metal in a way to minimize the stiffness in the non-load bearing elastomer section. In some cases, the bearing 200 and/or other similar embodiments, can comprise elastomer provided with selected contours or shapes that allow tuning of bearing stiffness. Although not shown, some alternative embodiments can comprise a split outer member that uses pins or fasteners to join the pieces. In other embodiments, the non-load bearing section can be provided without being bonded to the outer member 202 or the inner member 204.

Figure 8:
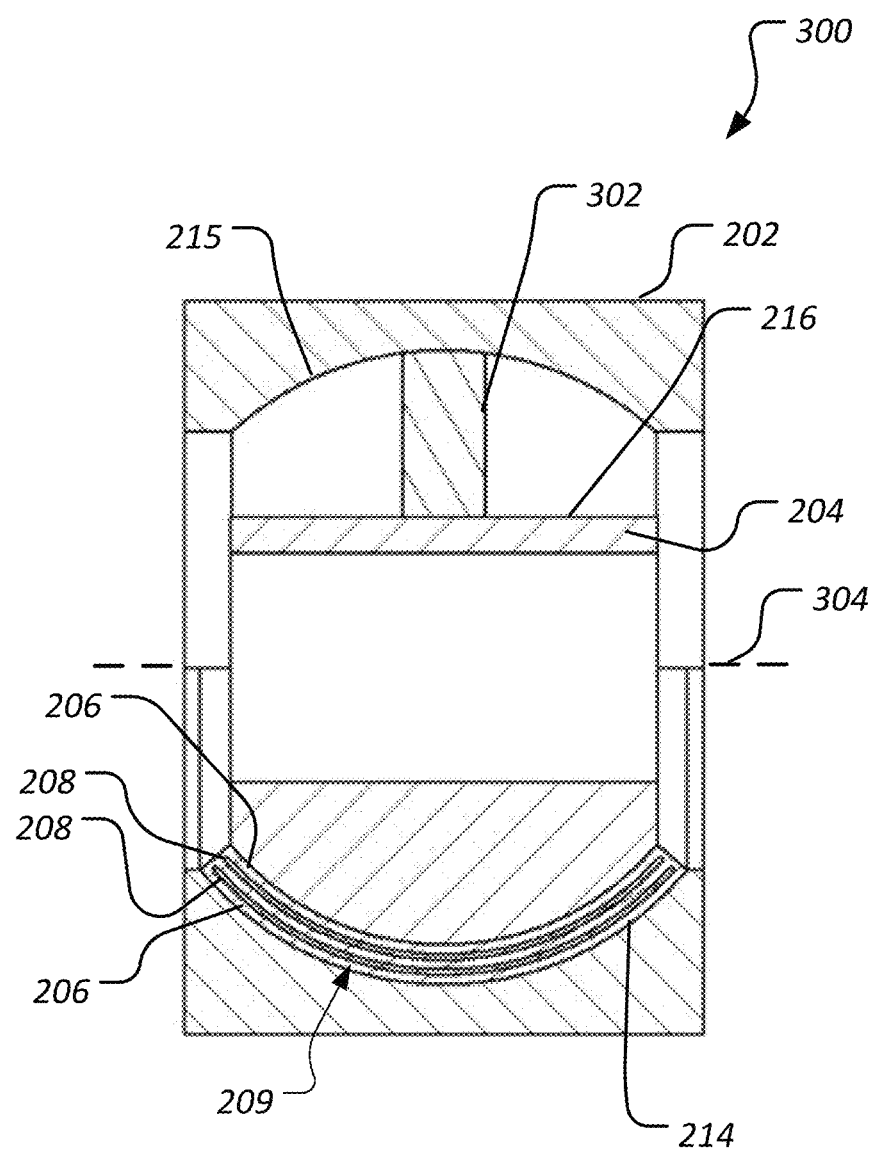
FIG. 8 shows a cross-sectional view of an alternative embodiment of an asymmetric bearing.

FIG. 8 shows a cross-sectional side view of asymmetric bearing 300 which is an alternative embodiment of an asymmetric bearing. Asymmetric bearing 300 is substantially similar to asymmetric bearing 200 but differs primarily by comprising a relatively thinner elastomeric spacer 302 as compared to elastomeric spacer 210, as measured parallel to a lengthwise central axis 304 of the asymmetric bearing 300. Reducing the amount of elastomeric material joined between the cylindrical upper profile 216 and the upper interior spherical profile 215 can reduce a rotational stiffness of the asymmetric bearing 300.

Figure 9:
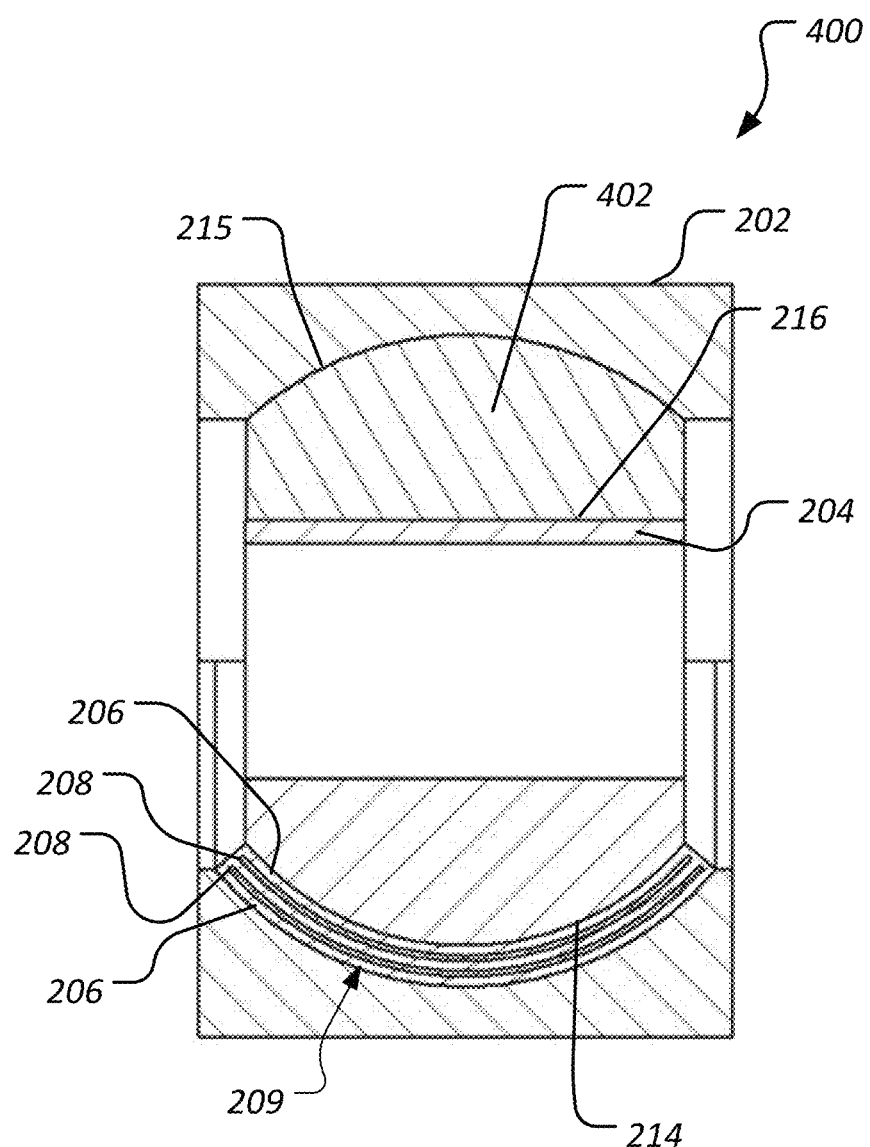
FIG. 9 shows a cross-sectional view of an alternative embodiment of an asymmetric bearing.

FIG. 9 shows a cross-sectional side view of asymmetric bearing 400 which is an alternative embodiment of an asymmetric bearing. Asymmetric bearing 400 is substantially similar to asymmetric bearing 200 but differs primarily by comprising a relatively vertically thicker elastomeric spacer 402 as compared to elastomeric spacer 210. Increasing the vertical thickness of the material joined between the cylindrical upper profile 216 and the upper interior spherical profile 215 can increase a rotational stiffness of the asymmetric bearing 300.

Figure 10:
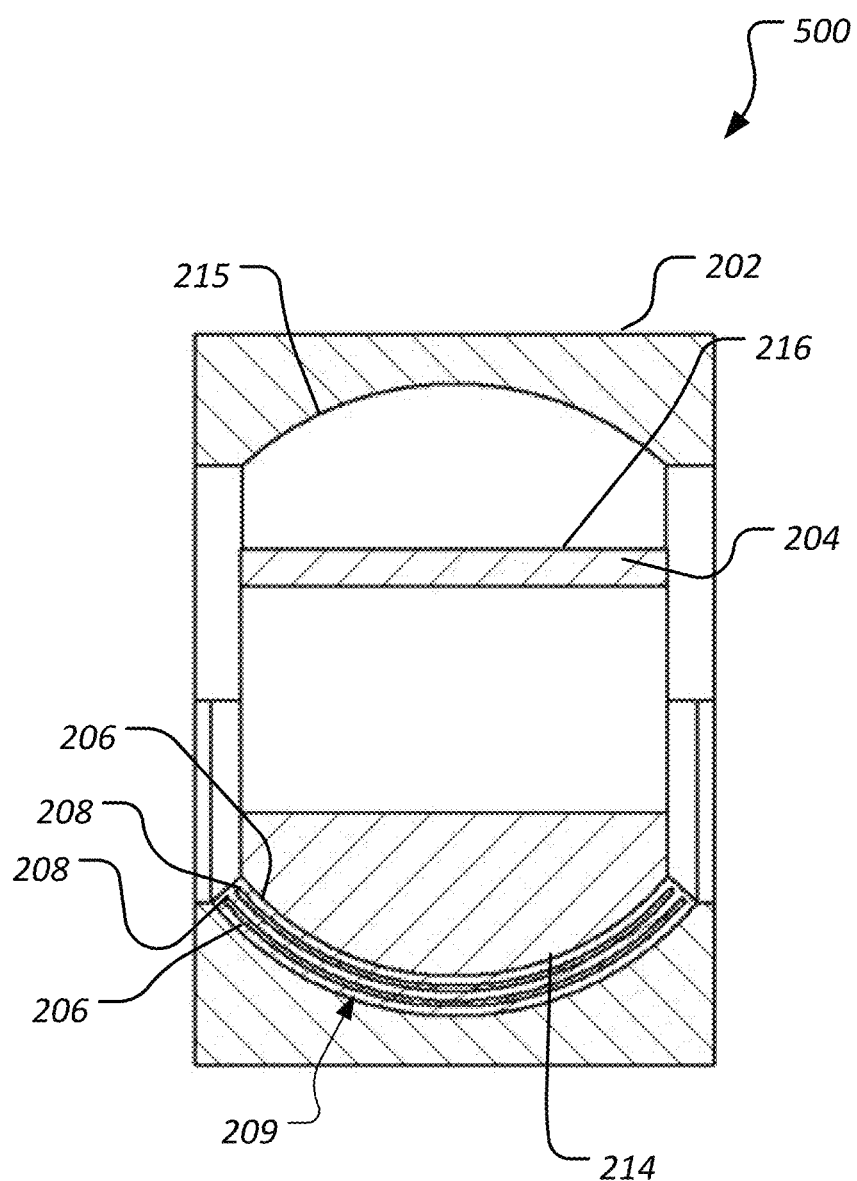
FIG. 10 shows a cross-sectional view of an alternative embodiment of an asymmetric bearing.

FIG. 10 shows a cross-sectional side view of asymmetric bearing 500 which is an alternative embodiment of an asymmetric bearing. Asymmetric bearing 500 is substantially similar to asymmetric bearing 200 but differs primarily by comprising no elastomeric spacer 210. By not joining the cylindrical upper profile 216 and the upper interior spherical profile 215 with elastomeric material, a rotational stiffness of the asymmetric bearing 500 can be lower relative to asymmetric bearing 200.

Figure 11:
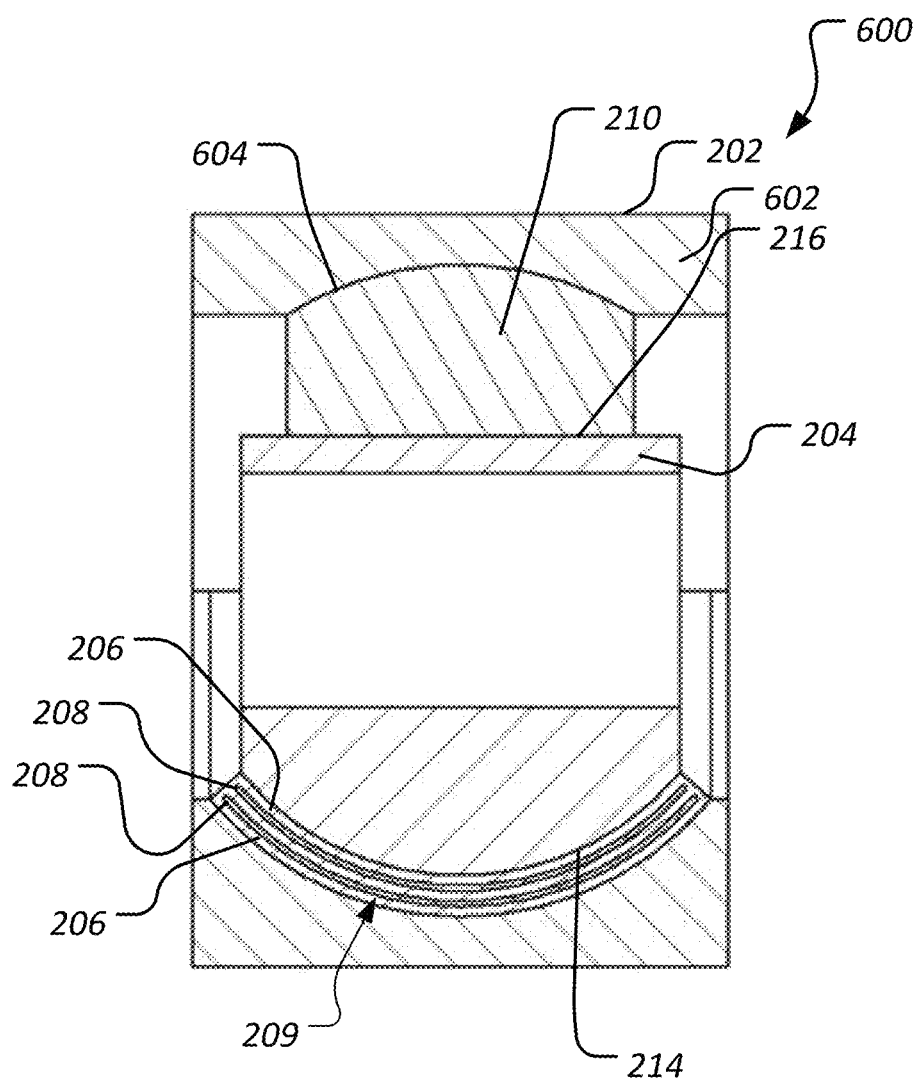
FIG. 11 shows a cross-sectional view of an alternative embodiment of an asymmetric bearing.

FIG. 11 shows a cross-sectional side view of asymmetric bearing 600 which is an alternative embodiment of an asymmetric bearing. Asymmetric bearing 600 is substantially similar to asymmetric bearing 200 but differs primarily by comprising a relatively vertically thinner upper wall 602 of the outer member 202. The reduced vertical thickness of the upper wall 602 can provide a vertically shallower upper interior spherical profile 604 and reduce a rotational stiffness of the asymmetric bearing 600.

Figure 12:
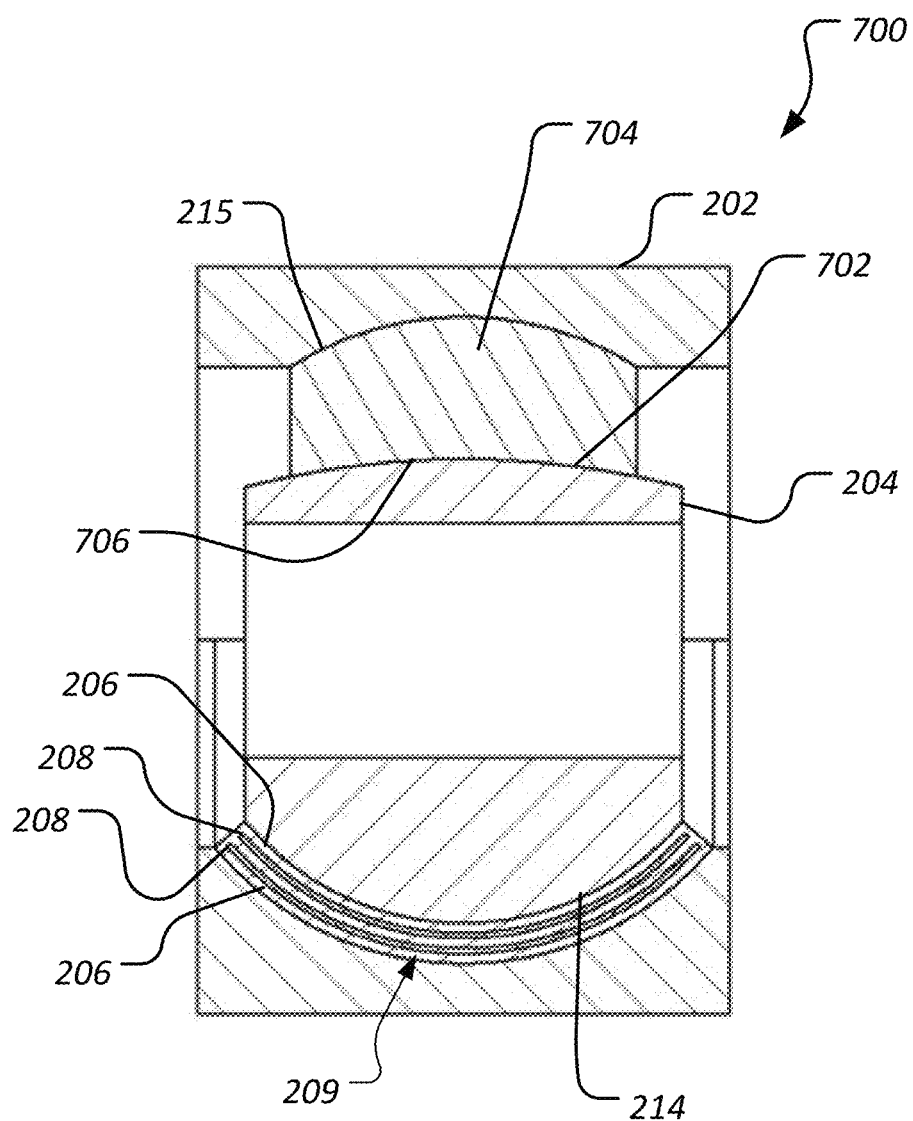
FIG. 12 shows a cross-sectional view of an alternative embodiment of an asymmetric bearing.

FIG. 12 shows a cross-sectional side view of asymmetric bearing 700 which is an alternative embodiment of an asymmetric bearing. Asymmetric bearing 700 is substantially similar to asymmetric bearing 200 but differs primarily by comprising a rounded upper profile 702 instead of a straight cylindrical upper profile 216. In this embodiment, an elastomeric spacer 704 comprises a rounded lower profile 706 complementary to the rounded upper profile 702. The rounded upper profile 702 can reduce a rotational stiffness of the asymmetric bearing 700 as compared to the asymmetric bearing 200.

Figure 13:
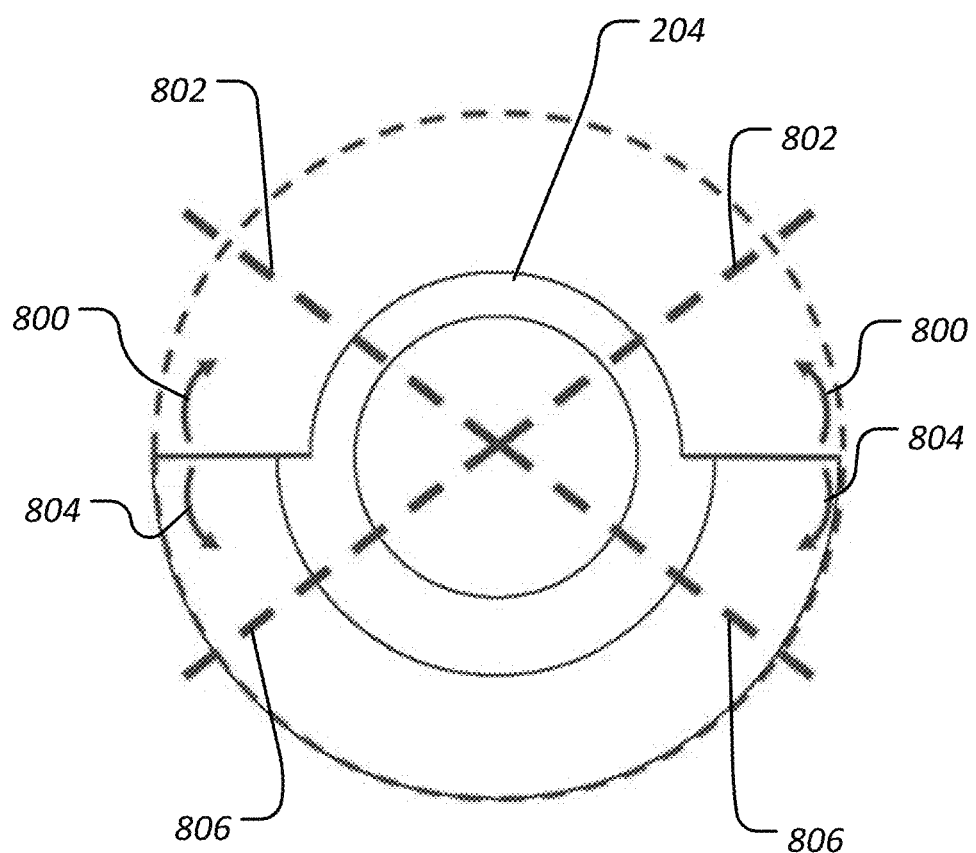
FIG. 13 diagrammatically shows an end view of an asymmetric bearing with markups indicating that some alternative embodiments can comprise more or less than a hemispherical profile.

Referring now to FIG. 13, an end view of an inner member 204 is shown with markups to indicated that alternative embodiments can comprise other than exactly a hemispherical shape. In some alternative embodiments, the spherical profile can extend further in the direction of the arrows 800 to provide a larger spherical portion. In some cases, an upper angular limit 802 may exist beyond which larger spherical portions are undesirable. In other alternative embodiments, the spherical profile can be reduced in the direction of the arrows 804 to provide less than a full hemispherical shape. In some cases, a lower angular limit 806 may exist beyond which smaller spherical portions are undesirable.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A bearing, comprising:
   an outer member comprising a cylindrical outer profile and an at least partially spherical interior profile;
   an inner member comprising an at least partially spherical outer profile and a substantially cylindrical outer profile; and
   an elastomeric spacer disposed between the outer member and the substantially cylindrical outer profile of the inner member.

2. The bearing of claim 1, further comprising a high capacity laminate (HCL) bearing stack disposed between the at least partially spherical interior profile of the outer member and the at least partially spherical outer profile of the inner member.

* * * * *